United States Patent
Riggs et al.

(10) Patent No.: US 10,598,305 B2
(45) Date of Patent: Mar. 24, 2020

(54) FLEXIBLE PIPE JOINT

(71) Applicant: LORD Corporation, Cary, NC (US)

(72) Inventors: David C. Riggs, Coppell, TX (US); Keith R. Ptak, Erie, PA (US)

(73) Assignee: LORD CORPORATION, Cary, NC (US)

( * ) Notice: Subject to any disclaimer, the term of this patent is extended or adjusted under 35 U.S.C. 154(b) by 193 days.

(21) Appl. No.: 15/750,925

(22) PCT Filed: Aug. 18, 2016

(86) PCT No.: PCT/US2016/047518
§ 371 (c)(1),
(2) Date: Feb. 7, 2018

(87) PCT Pub. No.: WO2017/031295
PCT Pub. Date: Feb. 23, 2017

(65) Prior Publication Data
US 2018/0231161 A1    Aug. 16, 2018

Related U.S. Application Data

(60) Provisional application No. 62/207,140, filed on Aug. 19, 2015.

(51) Int. Cl.
*F16L 27/04* (2006.01)
*F16L 27/00* (2006.01)
(Continued)

(52) U.S. Cl.
CPC ............ *F16L 27/00* (2013.01); *E21B 17/042* (2013.01); *E21B 17/05* (2013.01); *E21B 19/004* (2013.01);
(Continued)

(58) Field of Classification Search
CPC ......... F16L 27/11; F16L 27/103; F16L 27/04; F16L 27/047; F16L 27/06; F16L 27/067; F16L 27/073; E21B 17/08; E21B 17/05
See application file for complete search history.

(56) References Cited

U.S. PATENT DOCUMENTS 4,068,864 A * 1/1978 Herbert ................. F16L 27/103
285/146.3
4,121,861 A * 10/1978 Gorndt ................. E21B 17/085
285/223

(Continued)

FOREIGN PATENT DOCUMENTS

EP           1559941      8/2005
WO        2011119256     9/2011
(Continued)

*Primary Examiner* — David Bochna
(74) *Attorney, Agent, or Firm* — Lord Corporation

(57) ABSTRACT

A flexible pipe joint (200) includes a body (210) having a pin-end member (230) telescopically fitted within a box-end member (220), the pin-end member (230) including an outer connection profile (235) and the box-end member (220) including a complementary inner connection profile (225), a bearing (240) including an outer bearing surface (244), wherein the bearing (240) is fitted within the body (210) such that at least a portion of an inner body surface (212) interfaces with at least a portion the outer bearing surface (244), and wherein the bearing (240) includes an inner bearing surface (243), and an extension pipe (270) including an outer extension pipe surface (289), wherein the extension pipe (270) is fitted within the bearing (240) such that at least a portion of the inner bearing surface (243) interfaces with at least a portion of the outer extension pipe surface (289).

18 Claims, 6 Drawing Sheets

(51) Int. Cl.
*E21B 19/00* (2006.01)
*F16L 27/103* (2006.01)
*E21B 43/01* (2006.01)
*E21B 17/042* (2006.01)
*E21B 17/05* (2006.01)
*E21B 19/16* (2006.01)
*F16L 15/00* (2006.01)
*F16L 15/08* (2006.01)

(52) U.S. Cl.
CPC .......... *E21B 19/16* (2013.01); *E21B 43/0107* (2013.01); *F16L 15/003* (2013.01); *F16L 15/08* (2013.01); *F16L 27/103* (2013.01)

(56) References Cited

U.S. PATENT DOCUMENTS

| | | | |
|---|---|---|---|
| 4,183,556 A * | 1/1980 | Schwemmer | E21B 17/085 285/223 |
| 4,236,737 A * | 12/1980 | Herbert | F16L 27/082 285/234 |
| 4,298,221 A | 11/1981 | McGugan | |
| 4,460,201 A | 7/1984 | McGugan | |
| 4,491,348 A * | 1/1985 | Thelen | F16L 27/103 285/234 |
| 4,525,001 A | 6/1985 | Lumsden et al. | |
| 4,547,003 A | 10/1985 | McGugan | |
| 4,561,683 A | 12/1985 | Lumsden et al. | |
| 4,629,221 A | 12/1986 | Lumsden et al. | |
| 4,902,045 A | 2/1990 | McGugan et al. | |
| 4,984,827 A * | 1/1991 | Peppel | F16L 27/103 285/123.17 |
| 5,131,692 A | 7/1992 | Lemons | |
| 5,681,059 A | 10/1997 | Mackie | |
| 5,954,374 A * | 9/1999 | Gallagher | E21B 17/046 285/332 |
| 5,964,486 A | 10/1999 | Sinclair | |
| 6,164,707 A | 12/2000 | Ungchusri et al. | |
| RE39,695 E | 6/2007 | Ungchusri et al. | |
| 7,341,283 B2 * | 3/2008 | Moses | E21B 17/085 285/223 |
| 8,056,940 B2 | 11/2011 | Morgan et al. | |
| 8,366,352 B2 | 2/2013 | Pollack et al. | |
| 2003/0019625 A1 * | 1/2003 | Moog | E21B 19/004 166/242.6 |
| 2011/0227338 A1 | 9/2011 | Pollack et al. | |
| 2014/0300104 A1 | 10/2014 | Pollack | |
| 2014/0326502 A1 | 11/2014 | Gallagher | |
| 2016/0053567 A1 * | 2/2016 | Ptak | E21B 19/004 166/368 |
| 2016/0251910 A1 * | 9/2016 | Ptak | E21B 43/0107 166/367 |

FOREIGN PATENT DOCUMENTS

| | | |
|---|---|---|
| WO | 2011128658 | 10/2011 |
| WO | 2015066222 | 5/2015 |

* cited by examiner

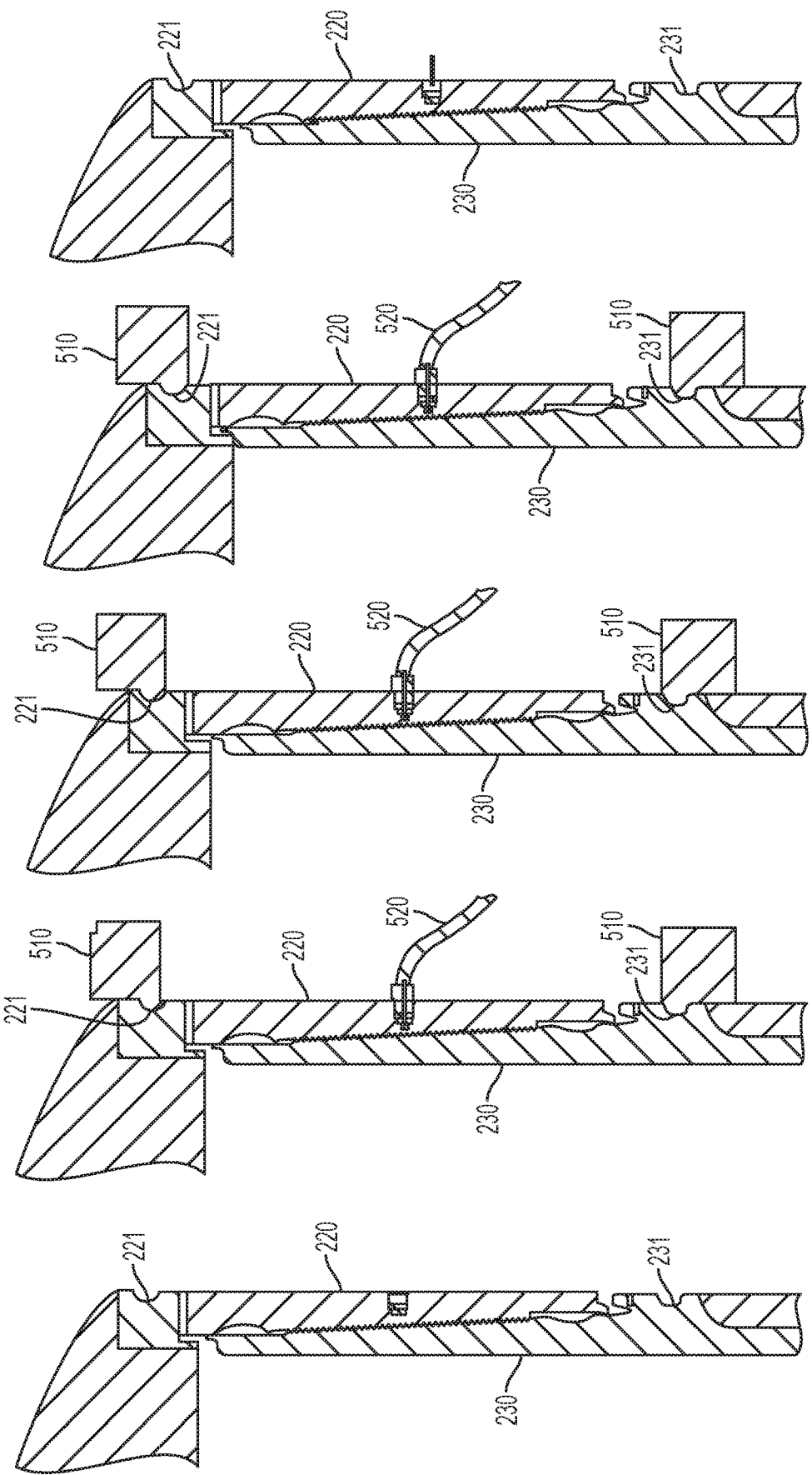

FLEXIBLE PIPE JOINT

CROSS-REFERENCE TO RELATED APPLICATIONS

The present application claims priority to U.S. Provisional Patent Application Ser. No. 62/207,140, filed on Aug. 19, 2015, entitled "FLEXIBLE PIPE JOINT," the disclosure of which is incorporated herein by reference in its entirety.

FIELD OF INVENTION

The subject matter disclosed herein generally relates to a flexible pipe joint and methods for assembling the same.

BACKGROUND

Floating Production Systems/Units (FPSs) consists of floating ocean platforms in deep water that import, process, store, offload and export oil and gas. Steel pipelines (Steel Catenary Risers, i.e., SCRs) are a primary means of transporting oil, gas, and water between an FPS and subsea wells, trunk lines, and offloading buoys. SCRs are normally hung off the FPS using low stress connections known as flexible pipe joints. The flexible pipe joints allow the SCRs to move relative to the FPSs. The desire to produce fluids from subsea wells capable of yielding relatively higher-pressure fluids necessitates that the SCRs and the flexible pipe joints be capable of withstanding those pressures. As such, a flexible pipe joint capable of withstanding high pressures and meeting high structural integrity demands is needed.

BRIEF DESCRIPTION OF THE DRAWINGS

FIGS. 4A through 4E are enlarged cross-sectional views of the pin-end member and the box-end member during assembly of the flexible pipe joint of FIG. 1.

DETAILED DESCRIPTION

Disclosed herein are embodiments of a flexible pipe joint, methods for assembling a flexible pipe joint, and systems using the same within a subsea environment to communicate fluids to or from a subsea wellbore.

Figure 1:
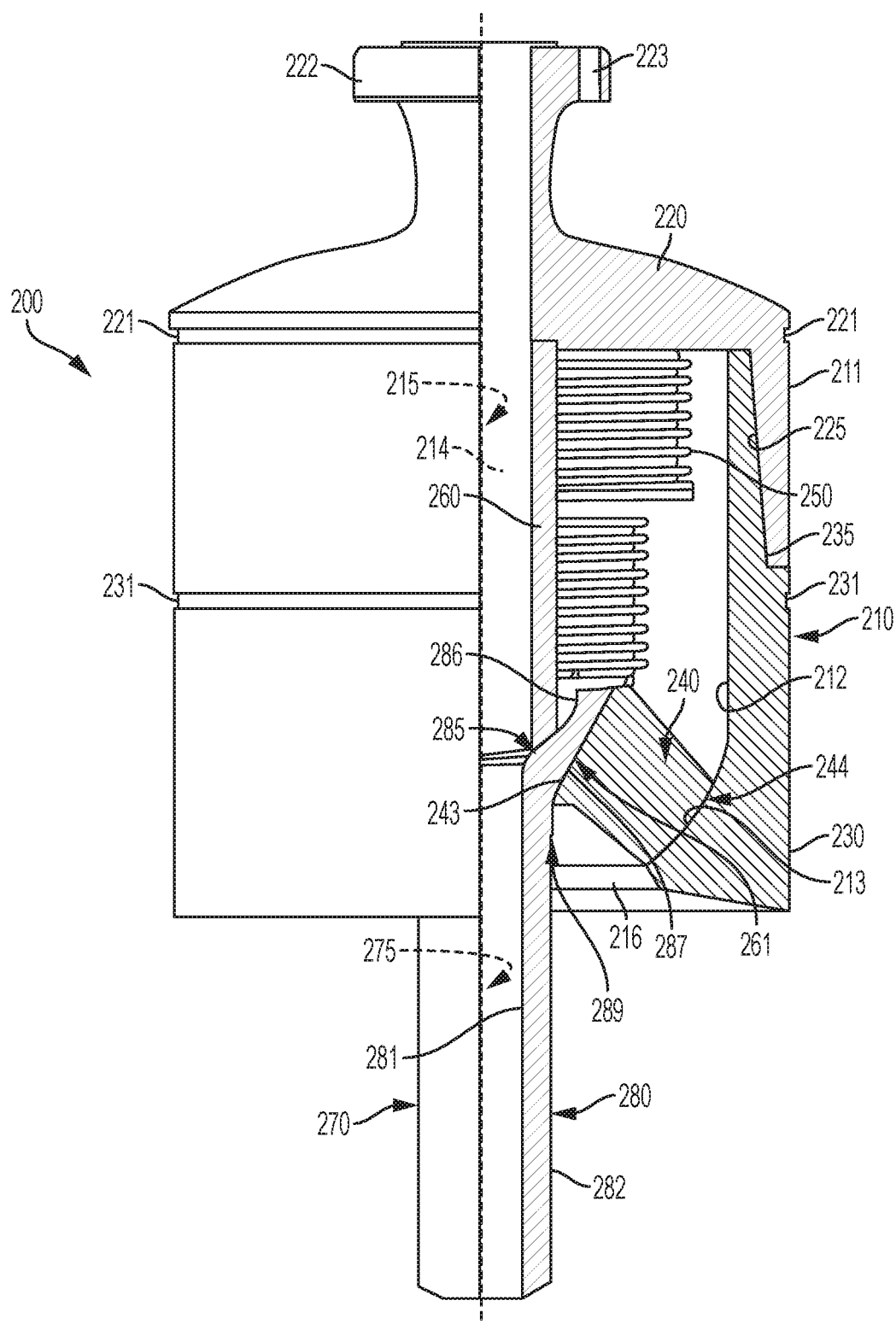
FIG. 1 is a partial cross-sectional view of an embodiment of a flexible pipe joint.

Referring to FIG. 1, an embodiment of the flexible pipe joint 200 is shown. The flexible pipe joint 200 generally includes a body 210 and an extension pipe 270. The body 210 and the extension pipe 270 are each generally radially symmetrical with respect to a body longitudinal axis 215 and an extension pipe longitudinal axis 275, respectively. The flexible pipe joint 200 is illustrated with the body longitudinal axis 215 being substantially coaxially aligned with the extension pipe longitudinal axis 275. The flexible pipe joint 200 is configured such that the extension pipe 270 may flex with respect to the body 210 such that the body longitudinal axis 215 and the extension pipe longitudinal axis 275 are angularly deflected from the coaxial alignment. For example, the flexible pipe joint 200 is configured to allow a maximum angular deflection between the body longitudinal axis 215 and the extension pipe longitudinal axis 275 of about 15° to about 20° from coaxial. In one embodiment, the maximum angular deflection is at least about 15°. Alternatively, the maximum angular deflection is at least about 16° from coaxial, at least about 17° from coaxial, at least about 18° from coaxial, at least about 19° from coaxial, or at least about 20° from coaxial. The body 210 and extension pipe 270 cooperatively define an axial flowbore 214 that extends through the flexible pipe joint 200. The axial flowbore 214 provides a route of fluid communication to SCRs connected to the flexible pipe joint 200.

The extension pipe 270 includes a cylindrical portion 280 and a flare portion 285. The cylindrical portion 280 generally defines an outer cylindrical surface 282 and a generally cylindrical inner surface 281, which defines at least a portion of the axial flowbore member 260. The flare portion 285 generally defines an outer flare surface 287 and an inner semispherical surface 286. Together, the outer flare surface 287 and the outer cylindrical surface 282 form an outer extension pipe surface 289. The outer flare surface 287 generally increases in diameter toward an upper terminal end of the extension pipe 270, that is, the outer flare surface 287 generally increases in diameter moving away from the cylindrical portion 280. The inner semispherical surface 286 generally increases in diameter at a decreasing toward the upper terminal end of the extension pipe 270. That is, the inner semispherical surface 286 generally increases in diameter moving away from the cylindrical portion 280. The extension pipe 270 may be configured for connection to a pipe, such as a pipe segment of an SCR. For example, the extension pipe 270 may be welded to a portion of an SCR.

The body 210 includes a box-end member 220 and a pin-end member 230, the pin-end member 230 being telescopically fitted within the box-end member 220. The body 210 is also configured to house a bearing 240, a bellows 250, and an axial flowbore member 260.

When the box-end member 220 is engaged with the pin-end member 230, as will be disclosed herein, the body 210 generally defines an outer body surface 211, an inner body surface 212, and a lower surface 213 toward a lower end of the body 210. The box-end member 220 includes a box-end tool groove 221 beneath the second outer cylindrical surface 211 and the pin-end member 230 includes a pin-end tool groove 231 beneath the second outer cylindrical surface 211. The inner body surface 212 abuts the lower surface 213, and the lower surface 213 terminates at the lower end of the body 210 at a circumferential opening 216.

The box-end member 220 includes a connection flange 222 suitable for connection to another component of production equipment such as a pipe segment of an SCR. The connection flange 222 includes a plurality of bolt holes 223 for securing the connection flange 222 to a complementary flange.

The box-end member 220 includes an inner connection profile 225 and the pin-end member 230 includes an outer connection profile 235. Engagement of the inner connection profile 225 with the outer connection profile 235 yields a connection 300 between the box-end member 220 and the pin-end member 230. While in some embodiments the inner connection profile 225 and the outer connection profile 235 include frustoconical shapes, in alternative embodiments, other complementary shapes may be utilized, such as, but not limited to, partially spherical shapes.

Figure 2:
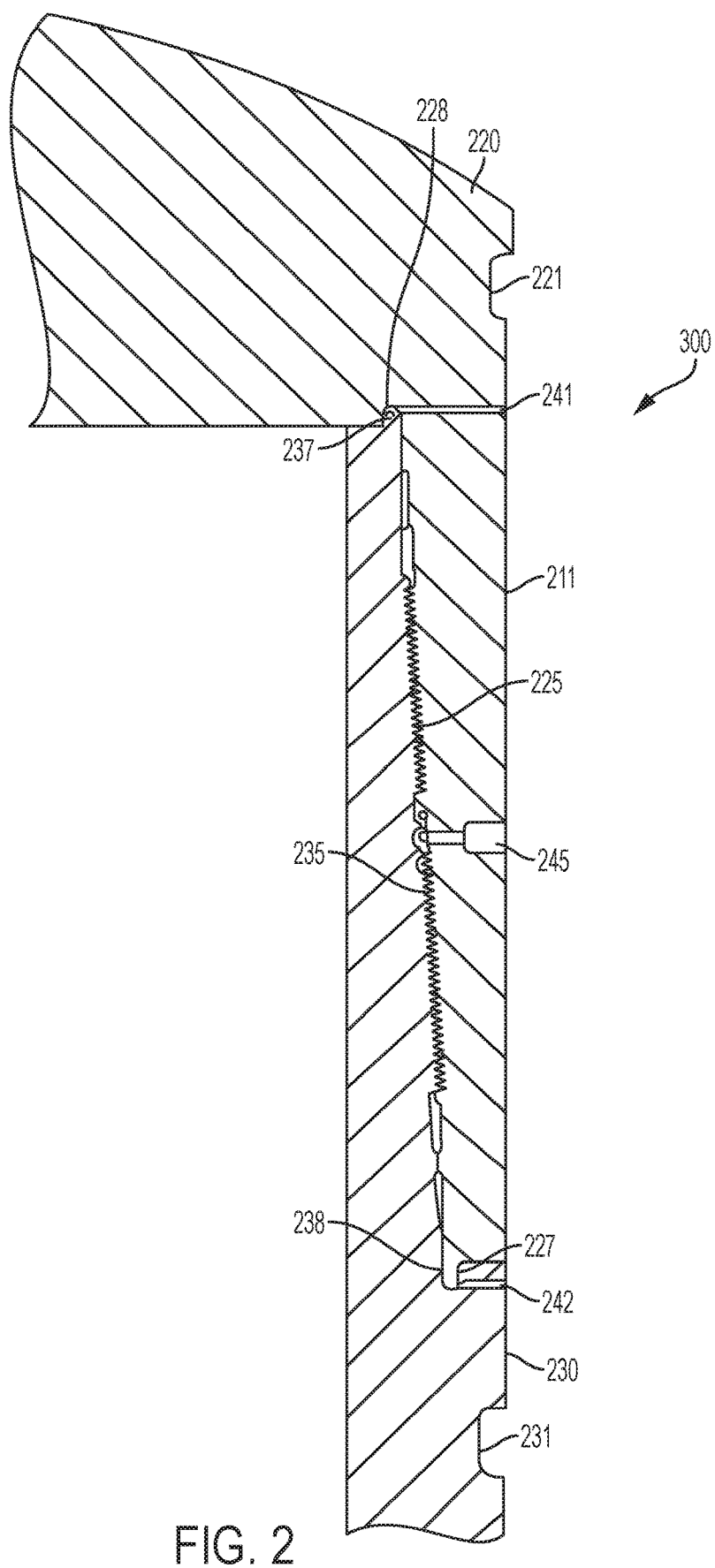
FIG. 2 is an enlarged cross-sectional view of a connection between a box-end member and a pin-end member of the flexible pipe joint of FIG. 1.
Figures 3A, 3B:
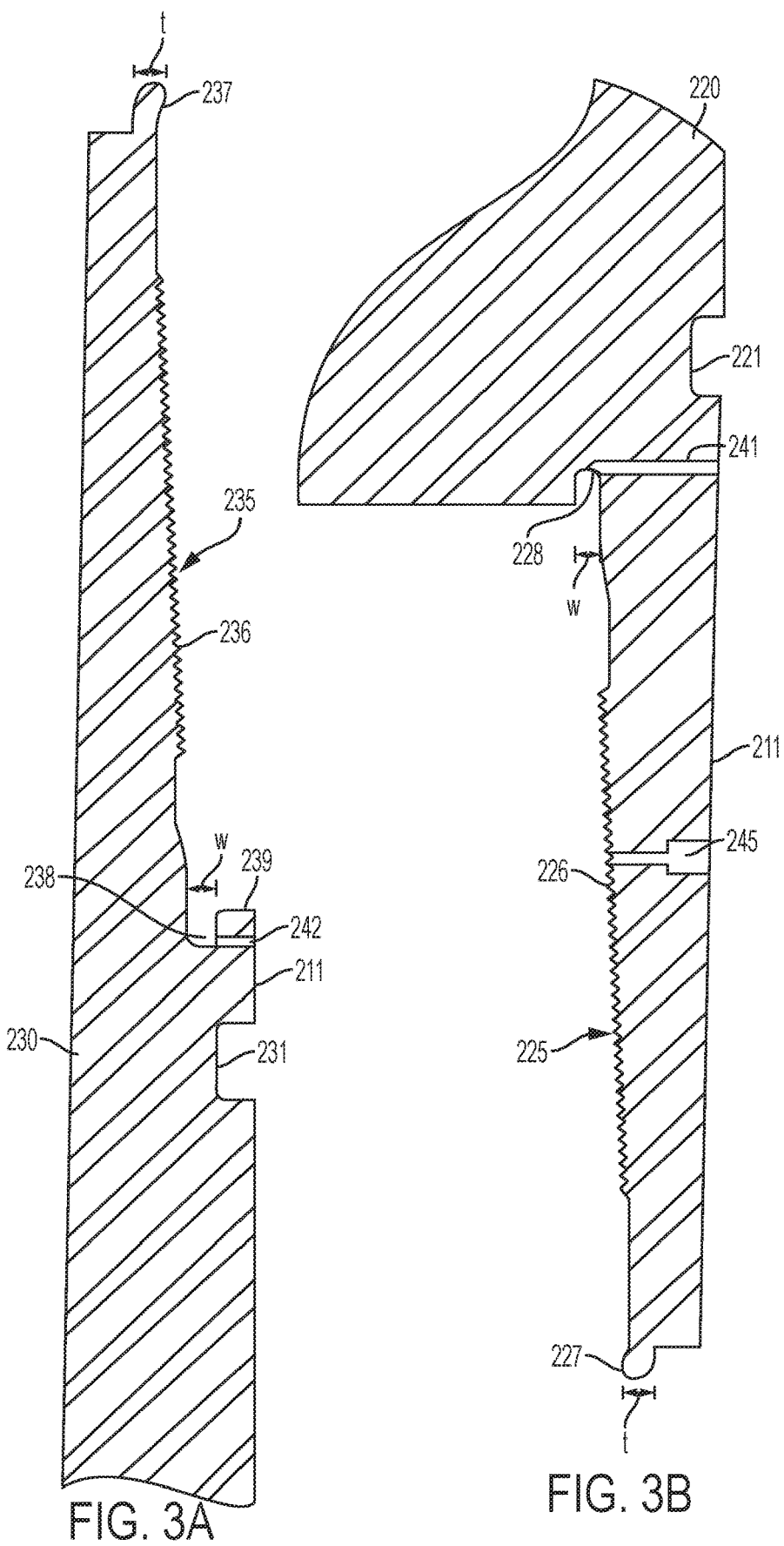
FIGS. 3A and 3B are enlarged cross-sectional views of the pin-end member and the box-end member, respectively, of FIG. 1

Referring to FIG. 2, an enlarged view of the connection 300 between the box-end member 220 and the pin-end member 230, particularly, between the inner connection profile 225 and the outer connection profile 235, is shown. Referring also to FIGS. 3A and 3B, enlarged views of the outer connection profile 235 of the pin-end member 230 and the inner connection profile 225 of the box-end member 220, respectively, are shown.

The inner connection profile 225 of the box-end member 220 includes an inner connection surface 226 having a plurality of inward-facing annular concentric grooves (e.g., valleys) and/or inward-facing annular concentric protrusions (e.g., peaks). Similarly, the outer connection profile 235 of the pin-end member 230 includes an outer connection surface 236 having a plurality of outward-facing annular concentric grooves (e.g., valleys) and/or outward-facing annular concentric protrusions (e.g., peaks). The inner connection profile 225 of the box-end member 220 is complementary to the outer connection profile 235 of the pin-end member 230. As used herein, a groove generally refers to a void space beneath a reference surface (for example, inner connection surface 226 or outer connection surface 236). As used herein a protrusion generally refers to a raised area above a reference surface (for example, inner connection surface 226 or outer connection surface 236). As such, the inner connection profile 225 and/or the outer connection profile 235 may be described as having grooves, protrusions, or both.

In the embodiment of FIGS. 2, 3A, and 3B, the annular grooves and/or annular protrusions of the inner connection profile 225 and the outer connection profile 235 are irregularly spaced and/or irregularly sized. For example, the inner connection profile 225 and the outer connection profile 235 include annular grooves and/or annular protrusions of varying sizes and/or spacings. As such, the inner connection profile 225 is only configured to fully engage the outer connection profile 235 when the complementary portions of the inner connection profile 225 is longitudinally (with respect to the body longitudinal axis 215) aligned with respect to the complementary portions of outer connection profile 235 thereby prohibiting the inner connection profile 225 from becoming only partially, but not fully, engaged with the outer connection profile 235. When the complementary portions of the inner connection profile 225 is longitudinally aligned (with respect to the body longitudinal axis 215) with respect to the complementary portions of outer connection profile 235, the annular grooves and projections of the inner connection profile 225 will engage with the corresponding annular projections and grooves of the outer connection profile 235.

Also in an embodiment of FIGS. 2, 3A, and 3B, the box-end member 220 and the pin-end member 230 include box-end nib 227 and pin-end nib 237, respectively. The box-end nib 227 and pin-end nib 237 are located at the terminal ends of the inner connection profile 225 and the outer connection profile 235, respectively, and are collar-like axial, circumferential extensions from each of the box-end member 220 and the pin-end member 230. The box-end member 220 and the pin-end member 230 include box-end groove 228 and pin-end groove 238, respectively. The box-end groove 228 is disposed at the non-terminal end of the inner connection profile 225. The pin-end groove 238 is disposed within a shoulder 239 at non-terminal end of the outer connection profile 235 at the intersection of the outer connection profile 235 and the outer body surface 211 of the pin-end member 230. The pin-end nib 237 at the terminal end of the outer connection profile 235 is complementary to the box-end groove 228 within the box-end member 220 and the box-end nib 227 at the terminal end of the inner connection profile 225 is complementary to the circumferential groove 238 within the pin-end member 230.

In an embodiment, when the complementary portions of the inner connection profile 225 is longitudinally aligned (with respect to the body longitudinal axis 215) with respect to the complementary portions of outer connection profile 235, the pin-end nib 237 at the terminal end of the outer connection profile 235 engages and forms seal with the box-end groove 228 within the box-end member 220 and, likewise, the box-end nib 227 at the terminal end of the inner connection profile 225 engages and forms a seal with the pin-end groove 238 within the pin-end member 230. In an embodiment, the box-end nib 227 and pin-end nib 237 have radial thicknesses, t, which are slightly greater than the radial widths, w, of the corresponding box-end groove 228 and pin-end groove 238, respectively. For example, the box-end nib 227 and pin-end nib 237 have a radial thicknesses, t, that are greater than the radial widths, w, of the complementary box-end groove 228 and pin-end groove 238, respectively, by about 0.0040 in. (about 0.10 mm), alternatively, about 0.0050 in. (about 0.13 mm), alternatively, about 0.0060 in. (about 0.15 mm), alternatively, about 0.0070 in. (about 0.18 mm). When the box-end nib 227 and pin-end nib 237 engage the corresponding box-end groove 228 and pin-end groove 238, respectively, the box-end nib 227 and pin-end nib 237 and the corresponding box-end groove 228 and pin-end groove 238, respectively, form an interference fit.

The box-end member 220 includes a box-end fluid port 241 that provides a route of fluid communication between the box-end groove 228 and the exterior of the body 210. Likewise, the pin-end member 230 includes a pin-end fluid port 242 that provides a route of fluid communication between the radial groove 238 and the exterior of the body 210. The box-end fluid ports 241 and pin-end fluid port 242 allow any fluid within the box-end groove 228 and the pin-end groove 238, respectively, to escape during make-up of the body 210, particularly, during assembly of the box-end member 220 and the pin-end member 230.

The box-end member 220 includes a hydraulic fluid port 245. The hydraulic fluid port 245 provides a route of fluid communication by which a hydraulic fluid can be used to pressurize the at least a portion of the interface between the inner connection profile 225 and the outer connection profile 235 during make-up of the body 210, particularly, during assembly of the box-end member 220 and the pin-end member 230.

Referring again to the embodiment of FIG. 1, the bearing 240 includes an inner portion configured to interface with the extension pipe 270 and an outer portion configured to interface with the body 210. For instance, the bearing 240 includes an inner bearing surface 243 and an outer bearing surface 244. The inner bearing surface 243 is substantially complementary to the outer flare surface 287 of the extension pipe 270 such that when the flexible pipe joint 200 is assembled, the inner bearing surface 243 forms a seal with the outer flare surface 287 of the extension pipe 270. In alternative embodiments, at least one layer of elastomer may be disposed between the inner bearing surface 243 and the outer flare surface 287. The layers of elastomer can be bonded to the outer flare surface 287 and/or the inner bearing surface 243. The outer bearing surface 244 is substantially complementary to the lower surface 213 of the body 210 such that when the flexible pipe joint 200 is assembled, the outer bearing surface 244 forms a seal with the lower surface 213 of the body 210. In an embodiment, the bearing 240 includes a stack of flexible elastomeric elements interspaced by metal shims. The flexible elastomeric elements may be bonded to the metal shims.

In an embodiment, the bellows 250 are generally configured to be of expandable or contractible length (e.g., with respect to the body longitudinal axis 215). In the embodiment of FIG. 1, the bellows 250 generally define a cylindrical void annularly around the axial flowbore member 260. In various embodiment, the bellows 250 are formed from a suitable material, examples of which include but are not limited to metallic alloys such as alloys including iron, nickel, chromium, or combinations thereof. The axial flowbore member 260 is a tubular member that defines at least a portion of the axial flowbore 214. In the embodiment of FIG. 1, the axial flowbore member 260 provides a route of fluid communication between the body 210 (e.g., the connection flanges 222) and the extension pipe 270. The axial flowbore member 260 includes a generally tubular member having a terminal end 261 configured to interface with the inner semispherical surface 286 of the extension pipe 270. In FIG. 1, the axial flowbore member 260 includes a semispherical end surface 262 that is generally complementary to the inner semispherical surface 286 of the extension pipe 270 such that the semispherical end surface 262 interacts with the inner semispherical surface 286 of the extension pipe 270 to form a seal.

Referring to FIGS. 4A-4E, an embodiment of a method by which the flexible pipe joint 200 is assembled, particularly, by which the pin-end member 230 is connected to the box-end member 220 to form the body 210, is illustrated.

In FIG. 4A, the pin-end member 230 is inserted within box-end member 220 and the pin-end member 230 and box-end member 220 are brought together until contact is established between the inner connection profile 225 of the box-end member 220 and the outer connection profile 235 of the pin-end member 230. At this point, the pin-end member 230 cannot be further telescoped within the box-end member 220 without the application of significantly greater axial forces. Prior to inserting the pin-end member 230 within box-end member 220, the extension pipe 270 will have been inserted through the bearing 240 and the pin-end member 230 of the body 210 such that inner bearing surface 243 of the bearing 240 interfaces with the outer flare surface 287 of the extension pipe 270 and such that the outer bearing surface 244 of the bearing 240 interfaces with the lower surface 213 of the pin-end member 230.

Referring to FIG. 4B, handling tools 510 (for example, clamping tools) are attached to the box-end tool groove 221 and the pin-end tool groove 231. The handling tools 510 are configured to apply axial forces sufficient to further telescope the pin-end member 230 within the box-end member 220. In addition, a hydraulic fluid hose 520 is attached to the hydraulic fluid port 245. Referring to FIG. 4C, hydraulic fluid is supplied to the interface between the inner connection profile 225 and the outer connection profile 235 and pressurized while axial pressure is applied to the pin-end member 230 and the box-end member 220 via the respective handling tools. Although the pin-end member 230 is not yet fully inserted within box-end member 220, the initial contact established between the inner connection profile 225 and the outer connection profile 235 is sufficient to allow the interface between the inner connection profile 225 and the outer connection profile 235 is be pressurized via the hydraulic fluid. The hydraulic fluid hose 520 may be used to increase the pressure to about 500 psi (about 3,447 kPa) to about 4,000 psi (about 27,580 kPa). In one embodiment, the hydraulic fluid hose 520 may be used to increase the pressure to at least 500 psi (about 3,447 kPa). Alternatively, the hydraulic fluid hose 520 may be used to increase the pressure to at least 1,000 psi (about 6,895 kPa), at least 2,000 psi (about 13,790 kPa), at least 3,000 psi (about 20,680 kPa), or at least 4,000 psi (about 27,580 kPa). Not intending to be bound by theory, the application of pressure (for example, fluid pressure) to the interface between the inner connection profile 225 and the outer connection profile 235 causes a distortion to the effective diameter of the inner connection profile 225, the outer connection profile 235, or both. More particularly, the application of fluid pressure to the interface between the inner connection profile 225 and the outer connection profile 235 causes the effective diameter of the inner connection profile 225 increase, causes the effective diameter of the outer connection profile 235 to decrease, or both. With the fluid pressure applied to the interface between the inner connection profile 225 and the outer connection profile 235, the axial forces applied to the pin-end member 230 and the box-end member 220 cause the pin-end member 230 to further telescope into the box-end member 220. In an alternative embodiment, no pressure is applied to the interface between the inner connection profile 225 and the outer connection profile 235 while the pin-end member 230 and the box-end member 220 are axially aligned.

Referring the FIG. 4D, as the pin-end member 230 to further telescopes into the box-end member 220, the complementary portions of the inner connection profile 225 and the outer connection profile 235 become aligned, allowing the inner connection profile 225 and the outer connection profile 235 to be fully engaged by snapping into an interlocked position toward their undistorted conical diameters. Also, the pin-end nib 237 at the terminal end of the outer connection profile 235 engages and forms a seal with the box-end groove 228 within the box-end member 220 and, likewise, the box-end nib 227 at the terminal end of the inner connection profile 225 engages and forms a seal with the circumferential groove 238 within the pin-end member 230, as shown in FIG. 4E. Any fluid trapped within box-end groove 228 or pin-end groove 238 escapes via the respective box-end fluid port 241 and pin-end fluid port 242.

The flexible pipe joint 200 disclosed herein is capable of withstanding and/or being configured to withstand relatively high pressures applied to the axial flowbore 214 thereof without being so large, heavy, or bulky as to be made unusable, uneconomical, or difficult to handle and/or assemble. For example, the flexible pipe joint 200 disclosed herein is capable of withstanding and/or being configured to withstand pressures of about 5,000 psi (about 34,474 kPa) to about 15,000 psi (about 103,421 kPa). In one embodiment, the flexible pipe joint 200 disclosed herein is capable of withstanding at least 5,000 psi (about 34,474 kPa). Alternatively, the flexible pipe joint 200 disclosed herein is capable of withstanding at least about 6,000 psi (about 41,369 kPa), at least about 7,000 psi (about 48,263 kPa), at least about 8,000 psi (about 55,158 kPa), at least about 9,000 psi (about 62,053 kPa), at least about 10,000 psi (about 68,948 kPa), at least about 12,500 psi (about 86,184 kPa), or at least about 15,000 psi (about 103,421 kPa). In order to configure a conventional flexible pipe joint that utilizes a conventional flanged connection, that is, a bolted connection utilizing one or more flanged surfaces, in order to assemble or make-up the body thereof, would require that the flanged connection be so large as to render such a conventionally-designed flexible pipe joint very large. Not intending to be bound by theory, in order to build a flexible pipe joint that is able to withstand such relatively high pressures utilizing a conventional flanged connection would require that those flanged surfaces be made very large so as to provide enough surface area to accommodate a bolt-pattern having a sufficient number of bolts. The flexible pipe joint 200 disclosed herein, which does not utilized such a conventional flanged connection to make-up the body 210, is capable of withstanding relatively high pressures without the need to exponentially increase the size (e.g., diameter) of the body in order to accommodate such pressures.

Figure 5:
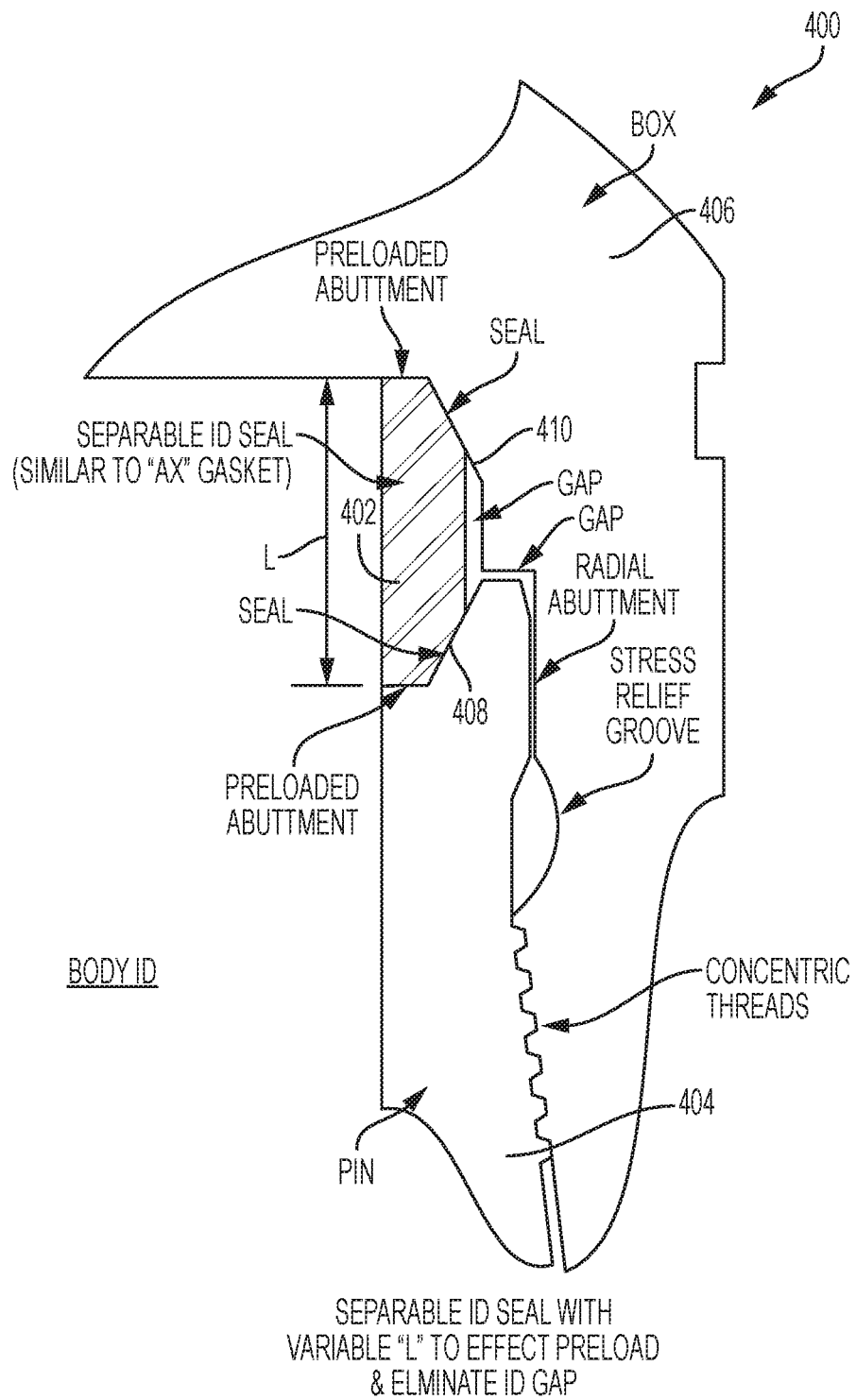
FIG. 5 is an enlarged cross-sectional view of an upper portion of an alternative embodiment of a flexible pipe joint showing a connection between a box-end member and a pin-end member, the connection utilizing a separable inside diameter (ID) seal.

Referring now to FIG. 5, a partial cross-sectional view of an alternative embodiment of flexible pipe joint 400 is shown. The flexible pipe joint 400 is substantially similar to flexible pipe joint 200 but is further modified to accommodate and utilize a separable inside diameter (ID) seal 402 disposed between the pin-end member 404 and the box-end member 406 instead of the integral sealing provided by the combination of the pin-end nib 237 and box-end groove 228. The separable ID seal 402 can comprise a material that is the same as one or both of the pin-end member 404 and the box-end member 406 but can also be formed of a material different from both of the pin-end member 404 and the box-end member 406. For example, in some cases where one or both of the pin-end member 404 and the box-end member 406 comprise steel, the separable ID seal 402 can comprise a titanium alloy. In this embodiment, the separable ID seal 402 is received against a pin-end seal profile 408 of the pin-end member 404 and a box-end seal profile 410 of the box-end member 406. The separable ID seal 402 generally comprises a ring-like structure.

Figure 6:
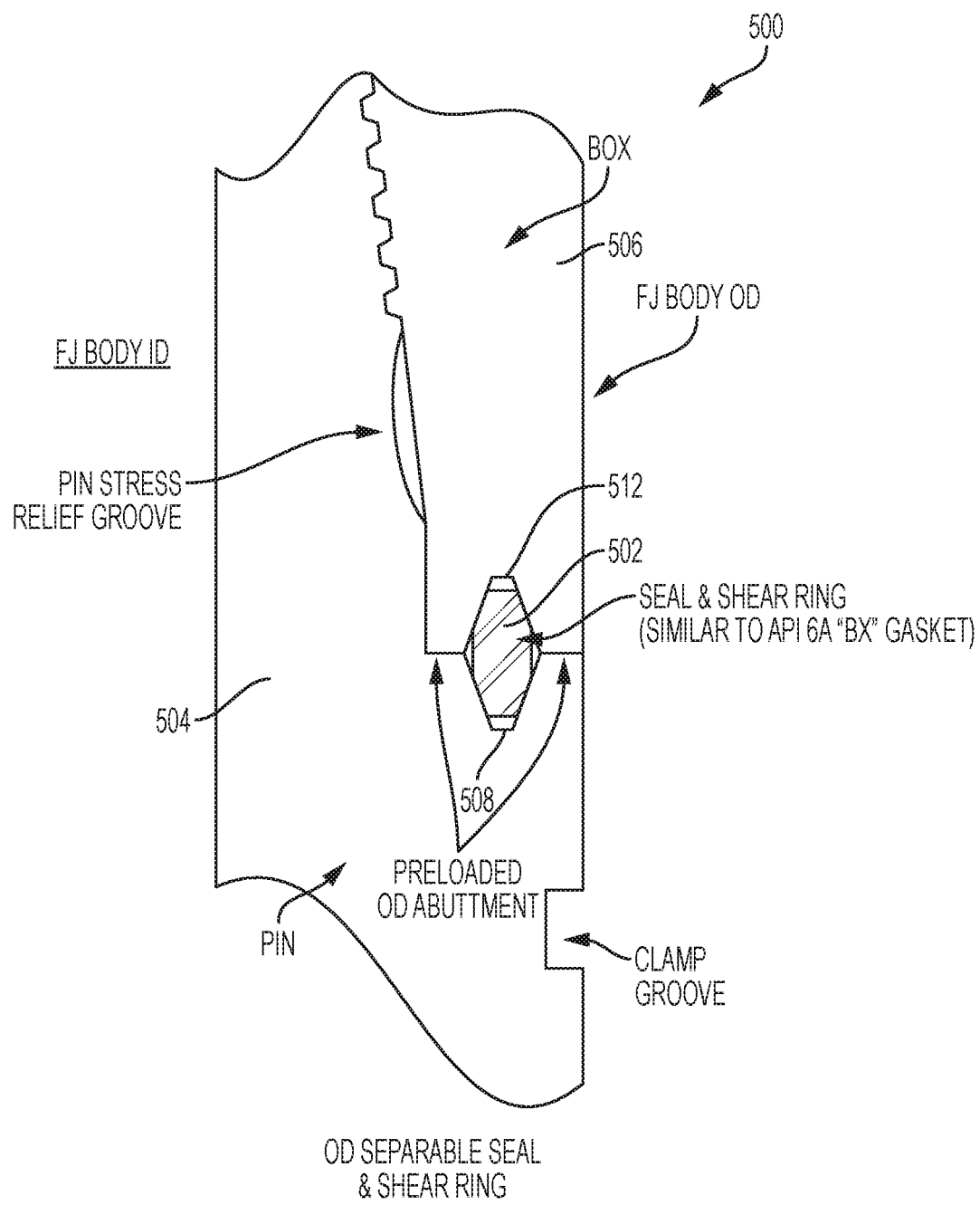
FIG. 6 is an enlarged cross-sectional view of a lower portion of an alternative embodiment of a flexible pipe joint showing a connection between a box-end member and a pin-end member, the connection utilizing a separable outside diameter (OD) seal.

Referring now to FIG. 6, a partial cross-sectional view of an alternative embodiment of flexible pipe joint 500 is shown. The flexible pipe joint 500 is substantially similar to flexible pipe joint 200 but is further modified to accommodate and utilize a separable outside diameter (OD) seal 502 disposed between the pin-end member 504 and the box-end member 506 instead of the integral sealing provided by the combination of the box-end nib 227 and pin-end groove 238. The separable OD seal 502 can comprise a material that is the same as one or both of the pin-end member 504 and the box-end member 506 but can also be formed of a material different from both of the pin-end member 504 and the box-end member 506. For example, in some cases where one or both of the pin-end member 504 and the box-end member 506 comprise steel, the separable OD seal 502 can comprise a titanium alloy. In this embodiment, the separable OD seal 502 is received at least partially within a pin-end seal channel 508 of the pin-end member 504 and a box-end seal channel 512 of the box-end member 506. The separable OD seal 502 generally comprises a ring-like structure.

In some cases, additional control of connected preload between the pin-end members 404, 504 and the box-end members 406, 506, respectively, can be provided when selecting the axial lengths of the seals 402, 502 and the material of the seals 402, 502. Varying the elastic moduli and stiffness of the seals 402, 502 and varying abutment shoulders can be used to apply additional and/or controlled connected preload. In some cases, separable ID seal 402 can compensate for disparate axial movements due to Poisson's ratio during make-up to improve or effect ID abutment sealing and preload. Further, the ability to remove and replace separable seals 402, 502 with various axial widths and lengths and moduli can effect sealing repair, modify connection preload properties, provide improved corrosion seal resistance properties, and/or provide interfacing with corrosion cladding.

Other embodiments of the current invention will be apparent to those skilled in the art from a consideration of this specification or practice of the invention disclosed herein. Thus, the foregoing specification is considered merely exemplary of the current invention with the true scope thereof being defined by the following claims.

What is claimed is:

1. A flexible pipe joint (200) comprising:
   a body (210), wherein the body (210) includes a pin-end member (230) telescopically fitted within a box-end member (220),
      wherein the pin-end member (230) includes an outer connection profile (235) and the box-end member (220) includes an inner connection profile (225), wherein the outer connection profile (235) is complementary to the inner connection profile (225) and further comprises a frustoconical shape; and
      wherein the body (210) includes an inner body surface (212);
   a bearing (240), wherein the bearing (240) includes an outer bearing surface (244), wherein the bearing (240) is fitted within the body (210) such that at least a portion of the inner body surface (212) interfaces with at least a portion the outer bearing surface (244), and wherein the bearing (240) includes an inner bearing surface (243); and
   an extension pipe (270), wherein the extension pipe (270) includes an outer extension pipe surface (289), wherein the extension pipe (270) is fitted within the bearing (240) such that at least a portion of the inner bearing surface (243) interfaces with at least a portion of the outer extension pipe surface (289).

2. The flexible pipe joint (200) of claim 1, wherein the outer connection profile (235) comprises a plurality of outward-facing concentric annular protrusions above the frustoconical shape of the outer connection profile (235), a plurality of outward-facing concentric annular grooves (228) within the frustoconical shape of the outer connection profile (235), or a combination thereof.

3. The flexible pipe joint (200) of claim 2, wherein the inner connection profile (225) further comprises a frustoconical shape.

4. The flexible pipe joint (200) of claim 3, wherein the inner connection profile (225) further comprises a plurality of inward-facing concentric annular protrusions above the frustoconical shape of the inner connection profile (225), and plurality of inward-facing concentric annular grooves (228) within the frustoconical shape of the inner connection profile (225), or a combination thereof.

5. The flexible pipe joint (200) of claim 1, wherein the pin-end member (230) further comprises a pin-end nib (237), wherein the pin-end nib (237) is fitted within a box-end groove (228) of the box-end member (220).

6. The flexible pipe joint (200) of claim 5, the box-end member (220) further comprises a box-end nib (227), wherein the box-end nib (227) is fitted within a pin-end groove (238) of the pin-end member (230).

7. The flexible pipe joint (200) of claim 1, wherein the bearing (240) further comprises a plurality of flexible elastomeric elements interspaced by metal shims.

8. The flexible pipe joint (200) of claim 1, wherein the outer bearing surface (244) further comprises a semispherical shape, and wherein the inner body surface (212) comprises an inner semispherical surface (286).

9. The flexible pipe joint (200) of claim 1, wherein the outer extension pipe surface (289) further comprises a frustoconical shape, and wherein the inner bearing surface (243) comprises a frustoconical shape.

10. The flexible pipe joint (200) of claim 1, wherein the body (210) further comprises a connection flange (222).

11. The flexible pipe joint (200) of claim 1, further comprising a bellows (250).

12. A method of assembling a flexible pipe joint (200) comprising:
providing a body (210), wherein the body (210) includes a pin-end member (230) and a box-end member (220), wherein the pin-end member (230) includes an outer connection profile (235) and the box-end member (220) includes an inner connection profile (225), wherein the outer connection profile (235) is complementary to the inner connection profile (225) and further comprises a frustoconical shape, wherein assembling the flexible pipe joint (200) body (210) includes:
inserting an extension pipe (270) through a bearing (240) and the pin-end member (230);
telescopically inserting the pin-end member (230) within the box-end member (220) until the inner connection profile (225) contacts the outer connection profile (235); and
applying an axial force to the pin-end member (230) and the box-end member (220) to align the outer connection profile (235) with the inner connection profile (225).

13. The method of claim 12, further comprising applying a fluid pressure to an interface between the outer connection profile (235) and the inner connection profile (225) while applying the axial force to the pin-end member (230) and the box-end member (220).

14. The method of claim 13, further comprising, prior to applying the axial force to the pin-end member (230) and the box-end member (220), attaching a hydraulic fluid hose (520) to a box-end fluid port (241) within the box-end member (220).

15. The method of claim 12, further comprising, prior to applying the axial force to the pin-end member (230) and the box-end member (220), engaging the pin-end member (230), the box-end member (220), or both with a handling tool.

16. The method of claim 12, wherein the outer connection profile (235) further comprises a plurality of outward-facing concentric annular protrusions above the frustoconical shape, a plurality of outward-facing concentric annular grooves (228) within the frustoconical shape, or combination thereof.

17. The method of claim 16, wherein the inner connection profile (225) further comprises a frustoconical shape.

18. The method of claim 17, wherein the inner connection profile (225) further comprises a plurality of inward-facing concentric annular protrusions above the frustoconical shape of the inner connection profile (225), and plurality of inward-facing concentric annular grooves (228) within the frustoconical shape of the inner connection profile (225), or a combination thereof.

\* \* \* \* \*